US011039408B2

(12) United States Patent
Hollabaugh et al.

(10) Patent No.: US 11,039,408 B2
(45) Date of Patent: Jun. 15, 2021

(54) METHODS AND APPARATUS FOR SYNCHRONIZATION AMONG INTEGRATED CIRCUITS WITHIN A WIRELESS NETWORK

(71) Applicant: Apple Inc., Cupertino, CA (US)

(72) Inventors: James Hollabaugh, San Jose, CA (US); Girault Jones, Cupertino, CA (US); Georgi Beloev, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 13/913,297

(22) Filed: Jun. 7, 2013

(65) Prior Publication Data

US 2013/0343365 A1 Dec. 26, 2013

Related U.S. Application Data

(60) Provisional application No. 61/656,908, filed on Jun. 7, 2012.

(51) Int. Cl.
*H04W 56/00* (2009.01)
*H04J 3/06* (2006.01)
*G06F 1/12* (2006.01)

(52) U.S. Cl.
CPC ............ *H04W 56/00* (2013.01); *G06F 1/12* (2013.01); *H04J 3/0697* (2013.01)

(58) Field of Classification Search
CPC ..... H04L 2012/6459; H04L 2012/6435; H04L 2012/644; H04W 56/00–0095; H04J 3/06–076; G06F 1/04–14
USPC ................................ 370/503, 509, 516, 520
See application file for complete search history.

(56) References Cited

U.S. PATENT DOCUMENTS

| | | | |
|---|---|---|---|
| 3,177,292 A | 4/1965 | Ewin | |
| 3,755,628 A | 8/1973 | Hughes et al. | |
| 4,083,005 A | 4/1978 | Looschen | |
| 4,087,643 A | 5/1978 | Joslow et al. | |

(Continued)

FOREIGN PATENT DOCUMENTS

| | | |
|---|---|---|
| EP | 0691617 A2 | 1/1996 |
| EP | 1427121 | 6/2004 |

(Continued)

OTHER PUBLICATIONS

Moustafa Youssef, et al. "PinPoint: An Asynchronous Time-Based Location Determination System", ACM 2 Penn Plaza, Jun. 2006.

(Continued)

*Primary Examiner* — Michael Thier
*Assistant Examiner* — Prince A Mensah
(74) *Attorney, Agent, or Firm* — Sterne, Kessler, Goldstein & Fox P.L.L.C.

(57) ABSTRACT

Methods and apparatus for synchronization of integrated circuits (ICs) within a wireless network. In one embodiment, a serial time protocol (STP) is disclosed for use within a wireless device of a wireless network. The disclosed STP provides a common protocol for communicating precision time information from one time-transmitter IC to another time-receiver IC within a wireless device. In one exemplary implementation, a time-transmitter and a time-receiver are implemented within the firmware of a wireless device. Various schemes utilizing the disclosed STP for time synchronization are also described.

18 Claims, 14 Drawing Sheets

(56) References Cited

U.S. PATENT DOCUMENTS

| | | | |
|---|---|---|---|
| 4,099,028 A | 7/1978 | Towson | |
| 4,216,426 A | 8/1980 | Flora | |
| 4,280,221 A | 7/1981 | Chun et al. | |
| 4,500,989 A | 2/1985 | Dahod | |
| 4,527,266 A | 7/1985 | Bogan et al. | |
| 4,543,654 A | 9/1985 | Jones | |
| 4,550,400 A | 10/1985 | Henderson, Jr. et al. | |
| 4,554,658 A | 11/1985 | Marten et al. | |
| 4,561,118 A | 12/1985 | Thinschmidt et al. | |
| 4,701,904 A | 10/1987 | Darcie | |
| 4,730,268 A | 3/1988 | Marin | |
| 4,745,597 A | 5/1988 | Morgan et al. | |
| 4,773,065 A | 9/1988 | Kobayashi et al. | |
| 4,785,396 A | 11/1988 | Murphy et al. | |
| 4,797,877 A | 1/1989 | Pope et al. | |
| 4,860,309 A | 8/1989 | Costello | |
| 5,160,929 A | 11/1992 | Costello | |
| 5,210,846 A | 5/1993 | Lee et al. | |
| 5,237,322 A | 8/1993 | Heberle | |
| 5,357,511 A | 10/1994 | Dinapoli et al. | |
| 5,448,311 A | 9/1995 | White et al. | |
| 5,469,431 A | 11/1995 | Wendorf et al. | |
| 5,487,066 A | 1/1996 | McNamara et al. | |
| 5,621,735 A | 4/1997 | Rochester, Jr. et al. | |
| 5,640,399 A | 6/1997 | Rostoker et al. | |
| 5,661,583 A | 8/1997 | Nhu | |
| 5,754,764 A | 5/1998 | Davis et al. | |
| 6,061,604 A | 5/2000 | Russ et al. | |
| 6,272,130 B1 | 8/2001 | Panahi et al. | |
| 6,393,020 B1 | 5/2002 | Patton | |
| 6,425,009 B1 | 7/2002 | Parrish et al. | |
| 6,532,274 B1* | 3/2003 | Ruffini | 375/356 |
| 6,542,754 B1 | 4/2003 | Sayers et al. | |
| 6,608,571 B1 | 8/2003 | Delvaux | |
| 6,766,381 B1 | 7/2004 | Barker et al. | |
| 6,965,299 B1 | 11/2005 | Dally et al. | |
| 7,295,578 B1 | 11/2007 | Lyle et al. | |
| 7,643,595 B2* | 1/2010 | Aweya | H03D 13/002 |
| | | | 375/356 |
| 7,792,158 B1* | 9/2010 | Cho | H04J 3/0664 |
| | | | 370/350 |
| 8,095,175 B2 | 1/2012 | Todd et al. | |
| 8,149,880 B1 | 4/2012 | Cho et al. | |
| 8,521,101 B1 | 8/2013 | Kadam et al. | |
| 8,811,372 B2* | 8/2014 | Li | H04W 56/0015 |
| | | | 370/350 |
| 2001/0004366 A1* | 6/2001 | Matsumura et al. | 370/509 |
| 2002/0012401 A1 | 1/2002 | Karolys et al. | |
| 2002/0116468 A1* | 8/2002 | Ishikawa | G06F 13/423 |
| | | | 709/208 |
| 2002/0154647 A1 | 10/2002 | Potash | |
| 2003/0078006 A1 | 4/2003 | Mahany et al. | |
| 2003/0115369 A1* | 6/2003 | Walter | H04L 12/4035 |
| | | | 709/253 |
| 2004/0001007 A1 | 1/2004 | Inoue et al. | |
| 2004/0022210 A1* | 2/2004 | Frank | 370/328 |
| 2004/0208200 A1 | 10/2004 | Hejdeman et al. | |
| 2004/0240404 A1 | 12/2004 | Ibrahim | |
| 2005/0057307 A1 | 3/2005 | Zhang et al. | |
| 2005/0069318 A1 | 3/2005 | Lee et al. | |
| 2005/0088443 A1 | 4/2005 | Blanco et al. | |
| 2005/0141565 A1* | 6/2005 | Forest et al. | 370/503 |
| 2006/0187969 A1 | 8/2006 | Kadowaki | |
| 2007/0211686 A1 | 9/2007 | Belcea et al. | |
| 2007/0291777 A1 | 12/2007 | Jamieson et al. | |
| 2008/0240021 A1 | 10/2008 | Guo et al. | |
| 2008/0287153 A1* | 11/2008 | Fullam | 455/502 |
| 2008/0298399 A1* | 12/2008 | Gou | H04J 3/0632 |
| | | | 370/503 |
| 2008/0315934 A1 | 12/2008 | Engl | |
| 2009/0077277 A1 | 3/2009 | Vidal et al. | |
| 2009/0161655 A1 | 6/2009 | Uppala | |
| 2010/0254345 A1 | 10/2010 | Raravi et al. | |
| 2011/0191512 A1 | 8/2011 | Beccue | |
| 2011/0216816 A1 | 9/2011 | Frenzel | |
| 2011/0228888 A1 | 9/2011 | Gelter et al. | |
| 2011/0231566 A1 | 9/2011 | Gelter et al. | |
| 2011/0286442 A1 | 11/2011 | Maurice et al. | |
| 2012/0001657 A1 | 1/2012 | Sullivan et al. | |
| 2012/0020417 A1* | 1/2012 | Wei | H04J 3/0638 |
| | | | 375/259 |
| 2012/0023255 A1* | 1/2012 | Edelman | H04L 47/10 |
| | | | 709/231 |
| 2012/0144078 A1 | 6/2012 | Poulsen | |
| 2012/0326768 A1 | 12/2012 | Bhattacharya et al. | |
| 2013/0188657 A1* | 7/2013 | Nedovic | H03M 9/00 |
| | | | 370/516 |
| 2013/0301634 A1* | 11/2013 | Ehlers | H04L 12/4625 |
| | | | 370/350 |
| 2013/0301635 A1 | 11/2013 | Hollabaugh et al. | |
| 2014/0068107 A1 | 3/2014 | Rajapakse | |
| 2014/0247834 A1 | 9/2014 | Poulsen | |

FOREIGN PATENT DOCUMENTS

| | | |
|---|---|---|
| WO | 2010083930 | 7/2010 |
| WO | 2012065823 | 5/2012 |

OTHER PUBLICATIONS

H-P Loeb, et al.: "Implementing a Softawre-Based 802.11 MAC on a Customized Platform" CCNC 2009. 6th IEEE, Piscataway, NJ Jan. 2009.

IEEE Standard for information technology—Local and metropolitan area networks—Specific requirements—Part 11: Wireless LAN Medium Access Control (MAC) and Physical Layer (PHY) specifications Amendment 8: IEEE 802.11 Wireless Network Management.

IEEE Standard for Local and Metropolitan Area Networks—Timing and Synchronization for Time-Sensitive Applications in Bridged Local Area Networks.

\* cited by examiner

Figure: An example frame with a valid time EDGE

METHODS AND APPARATUS FOR SYNCHRONIZATION AMONG INTEGRATED CIRCUITS WITHIN A WIRELESS NETWORK

PRIORITY

This application claims priority to co-owned, U.S. Provisional Patent Application Ser. No. 61/656,908 filed on Jun. 7, 2012 and entitled "METHODS AND APPARATUS FOR SYNCHRONIZATION AMONG INTEGRATED CIRCUITS WITHIN A WIRELESS NETWORK", the foregoing being incorporated herein by reference in its entirety.

RELATED APPLICATIONS

This application is related to co-owned, U.S. Provisional Patent Application Ser. No. 61/646,207 filed May 11, 2012 and entitled "METHODS AND APPARATUS FOR SYNCHRONIZING CLOCK SIGNALS IN A WIRELESS TEST SYSTEM" (now U.S. patent application Ser. No. 13/604,275), the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of integrated circuit (IC) operation within wireless networks. More particularly, the present disclosure is directed to precisely synchronizing ICs within a wireless network.

2. Description of Related Technology

As is well known within electronic circuit design arts, high speed integrated circuit (IC) design typically requires consistent and accurate distribution of a time reference. Specifically, an accurate time reference is required to, inter aria, ensure that data is processed correctly and consistently throughout the integrated circuit.

Wireless networking introduces a myriad of problems not previously encountered within traditional "wired" circuit design. For example, unlike wired circuits, wireless networks must robustly handle changing radio environments, unknown propagation delays, etc. Generally, wireless devices utilize an internal free-running oscillator to generate internal clocking. Due to manufacturing variance and tolerances in oscillator components, wireless networks must assume that each device has an imperfect time reference. For this reason, a myriad of synchronization schemes and standards for synchronizing time between wireless devices have been developed. Typical solutions provide time information periodically across the wireless network, each device of the network determines an appropriate adjustment to its local free-running clock. Ideally, if each device adjusts itself correctly, the overall wireless network should be synchronized.

As is appreciated by those of ordinary skill, wireless devices generally contain multiple internal components (including ICs), where each component has distinct timing requirements. For reasons discussed hereinafter, existing schemes for synchronizing wireless devices are inefficient and/or unsuitable for supporting distinct timing requirements of a wireless device's internal components. Thus, improved methods and apparatus for synchronizing components within a station on a wireless network system are needed.

SUMMARY

The present disclosure provides, inter alia, improved apparatus and methods for precisely synchronizing components within a wireless network.

A method for synchronization of integrated circuits (IC) within a wireless device is disclosed. In one embodiment, the method includes generating an edge signal; calculating a time value associated with the edge signal; and transmitting the time value associated with the edge signal.

A method for precisely determining a time reference within a wireless device is disclosed. In one embodiment, the method includes receiving an edge signal; receiving a data value associated with the edge signal; and calculating a time reference based on the edge signal and the data value.

A temporal protocol is disclosed. In one embodiment, the protocol is a serialized time protocol configured for unidirectional communication between a time-transmitter and a time-receiver.

A method distributing temporal information is disclosed. In one embodiment, the information is distributed unidirectionally from a time "source" without any need for reply or acknowledgement using a serial protocol.

A wireless device is disclosed. In one embodiment, the device includes a WLAN or other wireless air interface that is configured to synchronize one or more internal time bases according to a serial time protocol (STP).

A computer readable apparatus is disclosed. In one embodiment, the apparatus includes at least one computer program configured to, when executed, implement time synchronization with a wireless device of a wireless network (e.g., WLAN).

Computerized logic configured to implement time synchronization within a wireless device is disclosed.

A master/slave timing architecture is disclosed. In one embodiment, the master (transmitter) communicates with the slave (receiver) via a unidirectional serial time protocol via a two-wire interface.

Other features and advantages of the present disclosure will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.

Overview

In one exemplary embodiment of the present disclosure, a temporal protocol (e.g., serial time protocol or STP) is disclosed for use within a wireless device of a wireless network. The disclosed protocol provides a common protocol for communicating precision time information from e.g., one time-transmitter integrated circuit (IC) to another time-receiver IC within a wireless device. Moreover, as described in greater detail hereinafter, the common protocol can be implemented within very low level firmware, and can provide significantly higher precision than existing software solutions without requiring expensive (or dedicated hardware).

In one exemplary embodiment, a time-transmitter and a time-receiver is implemented within the firmware of a wireless device. The time-transmitter/time-receiver communicate via at least two (2) input/outputs (IOs) (e.g., general purpose input output (GPIO), etc.), where at least one (1) IO can produce a signal edge based on an atomic operation executed within firmware. In one variant, the disclosed STP provides an edge signal for communicating time instants and a serial data signal for communicating time information.

Various schemes and implementations utilizing the disclosed exemplary STP for time synchronization are described in greater detail herein.

Detailed Description of Exemplary Embodiments

Exemplary embodiments of the present disclosure are now described in detail.

Methods—

Figure 1:
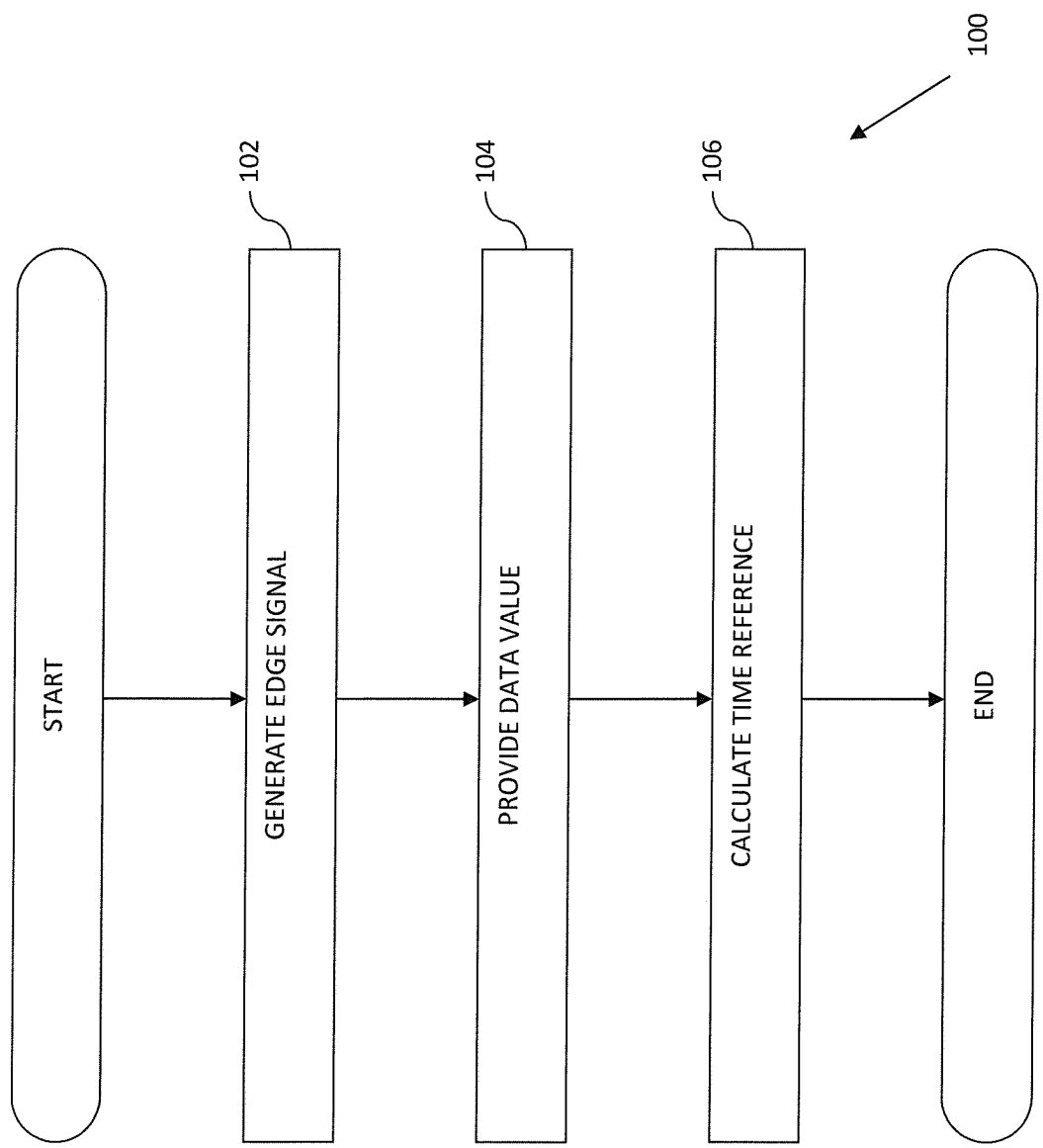
FIG. 1 is a logical flow diagram of one exemplary embodiment of a generalized method for precisely synchronizing integrated circuits (ICs) within a wireless network, in accordance with the present disclosure.

The following discussion of FIG. 1 provides an exemplary embodiment of a generalized method for precisely synchronizing integrated circuits (ICs) within a wireless network.

At step 102 of the method 100, an edge signal is generated with high precision. As a brief aside, unlike other forms of digital logic which are based on logical levels (e.g., logical high ("1"), and logical low ("0")), so-called "edge", "edge-triggered", "edge signaling", etc. refers to logic configured to identify/produce signal transitions to denote a precise moment in time. Edge-triggered circuitry is classified as so-called "rising edge" or "falling edge". Rising edge circuitry is configured according to low-to-high signal transitions. Falling edge circuitry is configured according to high-to-low transitions. Still other implementations may be based on so-called "leading edge" or "following edge" logic. Various substitutions in edge-based logic are well within the skill of an artisan of ordinary skill in the arts.

In one embodiment, the edge signal is generated within firmware. As used herein, the term "firmware" relates generally and without limitation to very low-level software drivers configured to directly control the actual physical operation or mechanisms of the device. Generally, firmware is distinguished from higher-level software applications which leverage various degrees of abstraction and re-direction for operation. It is generally understood that the firmware provides only the most elementary and/or basic functions of device operation. Common examples of firmware instructions include e.g., writing a register, reading a register, asserting an output, reading an input, erasing a memory component, etc.

In various alternate embodiments, the edge signal may be generated within progressively higher layers of software, or by dedicated hardware elements. However, it should be appreciated that higher layers of software will generally detract from precision, as each layer of software abstraction adds significantly more flexibility in the resulting compiled instruction scheduling. Similarly, while dedicated hardware can be used to generate edges with very high precision, hardware solutions are fixed in function and generally cannot be re-programmed or changed once the device is fabricated. Typical examples of hardware solutions include for example: application specific integrated circuits (ASICs), field programmable gate arrays (FPGAs), programmable logic devices (PLDs), and even dedicated discrete logic gates.

In one embodiment of the method 100, the edge signal is generated according to an atomic operation. Within the related arts, the term "atomic" refers to a software operation or function that cannot be separated into component parts. Atomic operations are executed without compiler optimization. For example, an atomic operation to generate an edge transition ensures that the edge occurs at the moment of execution (i.e., the edge transition is not generated at a point selected by the compiler within a set of operations).

At step 104 of the method 100, a data value is provided with respect to the edge signal. In one exemplary embodiment, the data value is associated with the edge signal, but can be provided at a substantially later time. In some variants, the data value is provided substantially before the edge signal; alternatively, the data value can be provided substantially after the edge signal. One salient benefit of providing the data value at a substantially different time from the edge transition is that the data can be calculated by higher layers of software, which provides significantly more flexibility, but also takes significantly more time (and in some cases requires information which is not immediately available). For example, in one exemplary embodiment, a time-transmitter can issue an edge signal, and subsequently thereafter (after multiple processor cycles), provide a calculated absolute time value associated with the issued edge signal.

Moreover, common examples of useful data include without limitation, reference time values, delta values, relative values, modified values, instructions, etc. Moreover, it should also be appreciated that data values can span a wide range of data types. Common useful data types include e.g., incrementing counts, decrementing counts, as well as format specific data (e.g., HH:MM:SS, etc.).

For example, in one implementation, the data may be a reference time value. Reference time values are made with respect to a particular event, etc. Common examples of reference time values include e.g., countdowns, elapsed time values, time since an event, etc. In one such variant, a so-called "delta" time is used to represent a difference in time (i.e., an elapsed time between at least two events). In still other examples, data values may incorporate one or more modifications. For instance, a time-transmitter which is aware of a slight delta between its own reference clock and a time-receiver's reference clock may impute the delta into its reference clock values. This adjusted reference clock data represents the time-transmitter's adjustment for the time-receiver's reference clock domain for the issued edge event.

In still other embodiments, the data may be an instruction which is to be triggered at the edge event (or retroactively applied to the edge event). Common examples of instructions include, for example, resetting a time reference at the edge event, pre-setting a time reference at the edge event, advancing or retarding a time reference at the edge event, etc.

In one exemplary implementation of the present disclosure, the data comprises a formatted data frame. In one variant, the formatted data frame includes at least a header, and data. The data frame may additionally include a descriptor. Framed data provides multiple flexible capabilities, including e.g., flexibility in use, error checking, etc.

Referring again to FIG. 1, at step 106 of the method 100, a time reference is calculated based on the edge signal and the data value. In one embodiment, the time reference is directly derived from the data value. The time reference is determined based on the data value and a local reference clock in another variation.

Exemplary Apparatus—

Figure 2:
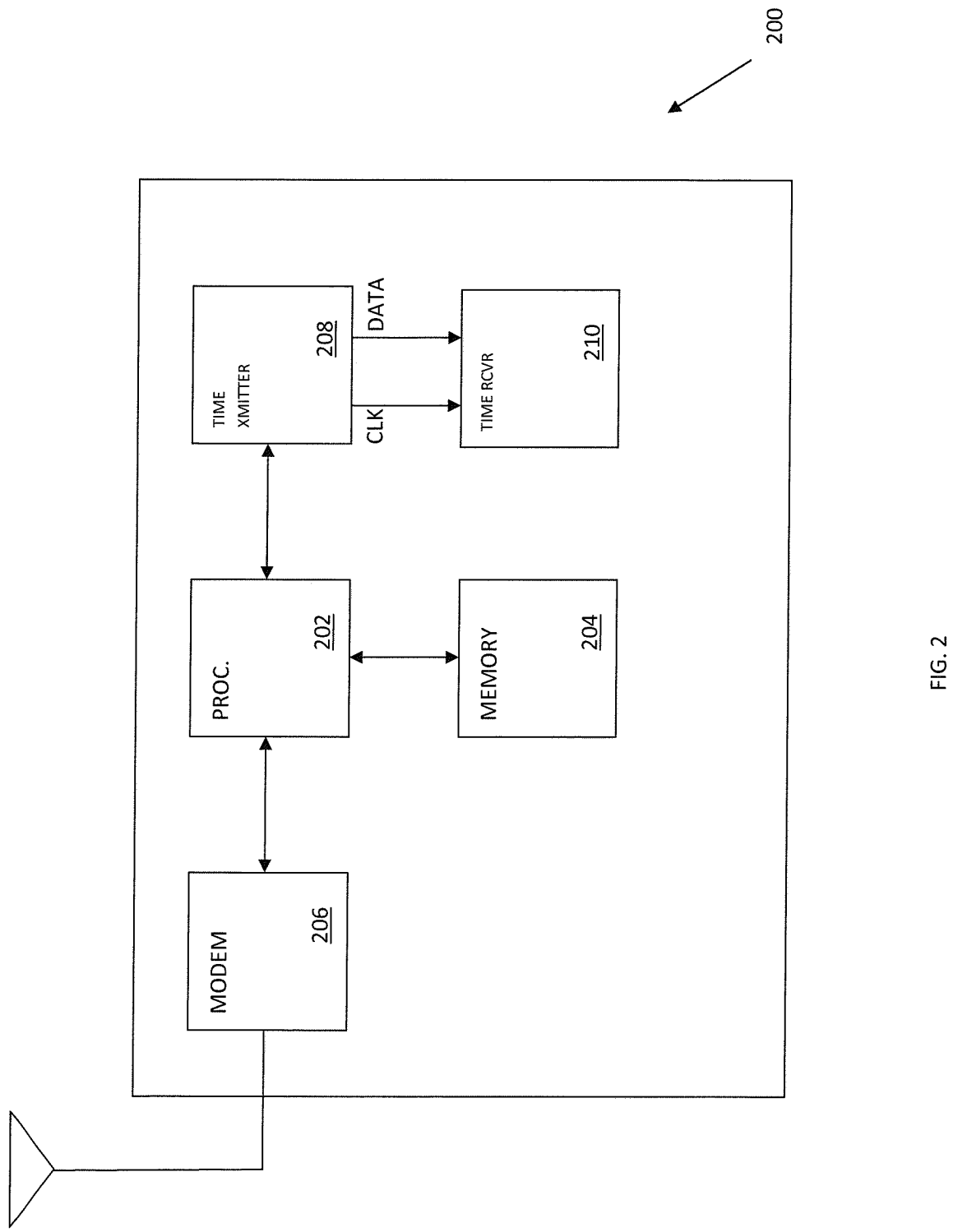
FIG. 2 is a logical block diagram of one exemplary wireless device configured to precisely synchronize integrated circuits (ICs) within a wireless network, according to various principles described herein.

Referring now to FIG. 2, one exemplary wireless device configured to precisely synchronize integrated circuits (ICs) within a wireless network is disclosed. As used herein, the term "wireless device" includes, but is not limited to cellular telephones, smartphones (such as for example an iPhone™ manufactured by the Assignee hereof), handheld or tablet computers, personal media devices (PMDs), wireless base stations, wireless access points, femtocells, or virtually any device with a wireless transmitter and/or receiver.

While a specific device configuration and layout is shown and discussed, it is recognized that many other implementations may be readily implemented by one of ordinary skill given the present disclosure, the exemplary wireless device 200 of FIG. 2 being merely illustrative of the broader principles described herein.

The processing subsystem 202 of the device 200 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 204, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown the processing subsystem 202 includes discrete components; however, it is understood that in some embodiments they may be consolidated or fashioned in a SoC (system-on-chip) configuration. It can be appreciated that, in one particular implementation, one or more firmware and/or software running on the processing subsystem may perform one or more of the steps discussed above with respect to FIG. 1 of the present disclosure.

The wireless device 200 further includes one or more wireless interfaces 206 which are configured to receive transmissions from a wireless network. The wireless interfaces may include virtually any wireless technology such as e.g., WLAN or WMAN networks (e.g. Wi-Fi-family, WiMAX, etc.), personal area networks (e.g. Bluetooth®, 802.15, etc.), or cellular (e.g. GSM, UMTS, CDMA, CDMA2000, WCDMA, EV-DO, 3GPP standards, LTE, LTE-A, EDGE, GPRS, HSPA, HSPA+, HSPDA, and/or HSPUA, etc.). In one exemplary embodiment, the wireless interface is a Wi-Fi family transceiver (802.11a, b, g, n, v, 802.11-2012, etc.), and includes a baseband processor.

In one embodiment, the wireless device further includes an internal time reference 206 such as a crystal oscillator (XO). Common examples of a crystal oscillator include voltage controlled XO (VCXO), temperature controlled XO (TCXO), voltage and temperature controlled XO (VCTCXO), etc. Still other forms of internal time references may be used including e.g., global positioning system (GPS) time, network time, etc. In still other embodiments, the wireless device may include one or more other discrete time references for constituent components and integrated circuits (IC).

The wireless device further includes at least one time-transmitter component 208 and at least one time-receiver component 210. Each of the at least one time-transmitter components 208 and at least one time-receiver components 210 are in this embodiment compliant with a commonly shared serial time protocol (STP). In one exemplary implementation, the STP interface includes two (2) general purpose input outputs (GPIO) which are configured to handle at least one edge signal and one or more logical data interfaces. For example, in one embodiment, the GPIO include at least a CLK and a DATA output. It is appreciated that yet other embodiments may utilize greater or fewer number of pins, the foregoing being purely illustrative.

In one exemplary embodiment, the time-transmitter apparatus 208 includes non-transitory computer-readable medium containing instructions which when executed are configured to generate an edge signal with high precision; calculate a time value associated with the edge signal, and provide the time value associated with the edge signal. In other embodiments, the time-transmitter apparatus includes logic configured to e.g., generate an edge signal with high precision, calculate a data value associated with the edge signal, and provide the data value.

In one exemplary embodiment of the apparatus 200, the time-receiver apparatus 210 includes non-transitory computer-readable media containing instructions which when executed are configured to receive an edge signal with high precision, receive a data value associated with the edge signal, and calculate a time reference based on the edge signal and the data value. In other embodiments, the time-transmitter apparatus includes logic configured to e.g., receive an edge signal with high precision, receive a data value associated with the edge signal, and calculate a time reference based on the edge signal and the data value.

Example Operation—

One exemplary serial time protocol (STP) useful for precise synchronization of integrated circuits within a wireless network is now discussed in greater detail.

Figure 3:
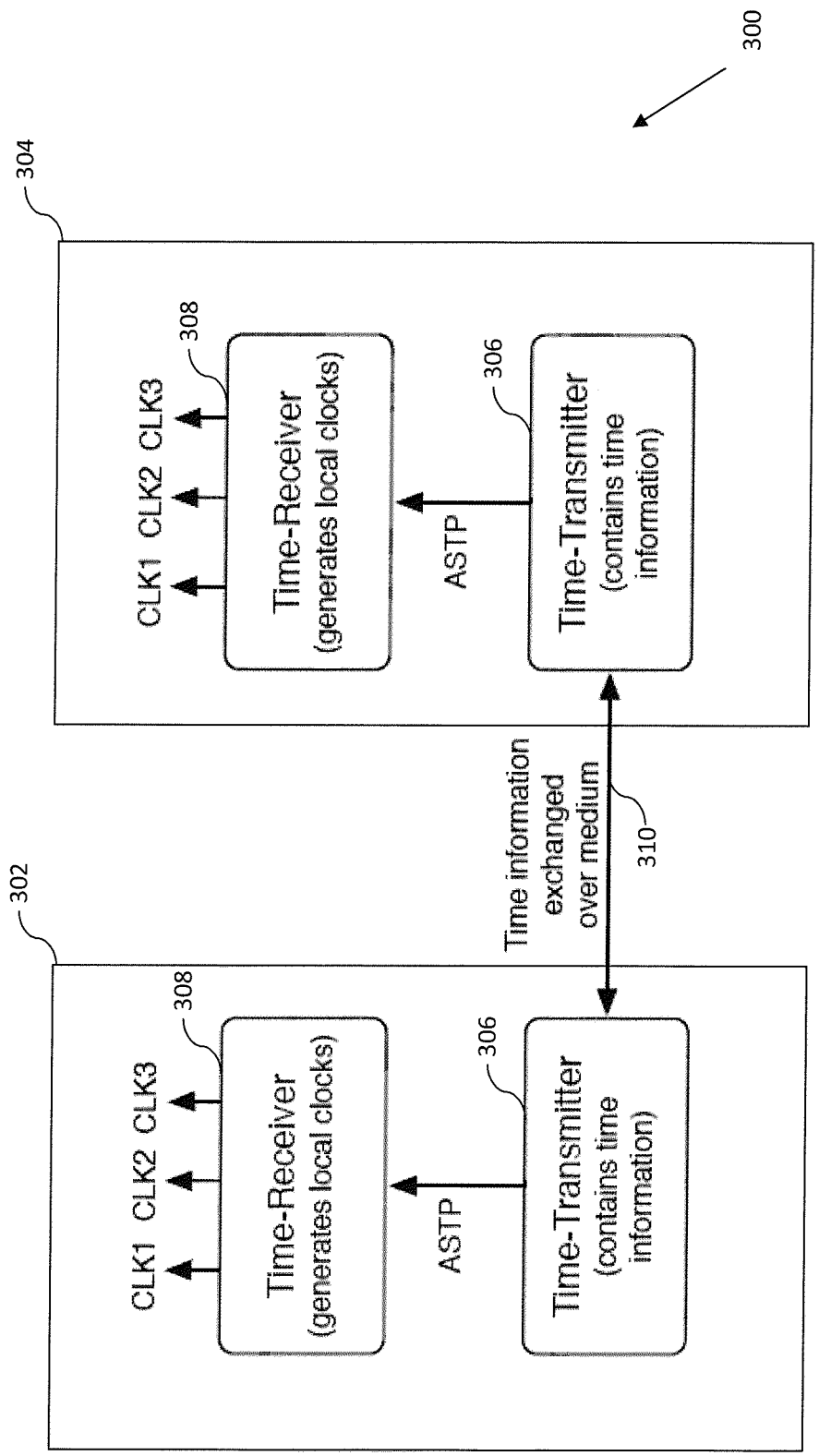
FIG. 3 is a graphical representation of one exemplary system including two (2) wireless device useful for illustrating various embodiments of the present disclosure.

Referring now to FIG. 3, one exemplary system 300 including two (2) wireless devices 302, 304 is shown. Each of the two wireless devices includes at least a time-transmitter 306 and a time-receiver 308 in communication via the exemplary STP. As shown, the devices exchange time information over a wireless medium or interface 310, but internally maintain the time synchronization of the component time-receivers. These time-receivers are further embodied within, or operatively connected to the clock generation circuitry of one or more component ICs of the wireless device.

The exemplary STP consists of a clock signal (CLK) and a data signal (DATA) which are transmitted via two (2) general purpose input outputs (GPIOs). While the following descriptions are provided within the context of unidirectional signaling from the time-transmitter to the one or more time-receivers, it should be appreciated by those of ordinary skill that such a topology is purely illustrative. In fact, a device may consist of one or more time-transmitters and one or more time-receivers, or some combination thereof. It should additionally be appreciated that unidirectional operation can be freely interchanged with bidirectional operation with equal success.

During normal operation, the time-transmitter transmits frames of data to the time-receiver. The time-receiver is configured to read (or clock in) DATA as a serial data stream on the rising edges of CLK. In some variants, the time-transmitter provides a continuous free-running clock; in other variants, the time-transmitter only provides a CLK signal during the frame.

Figure 4:
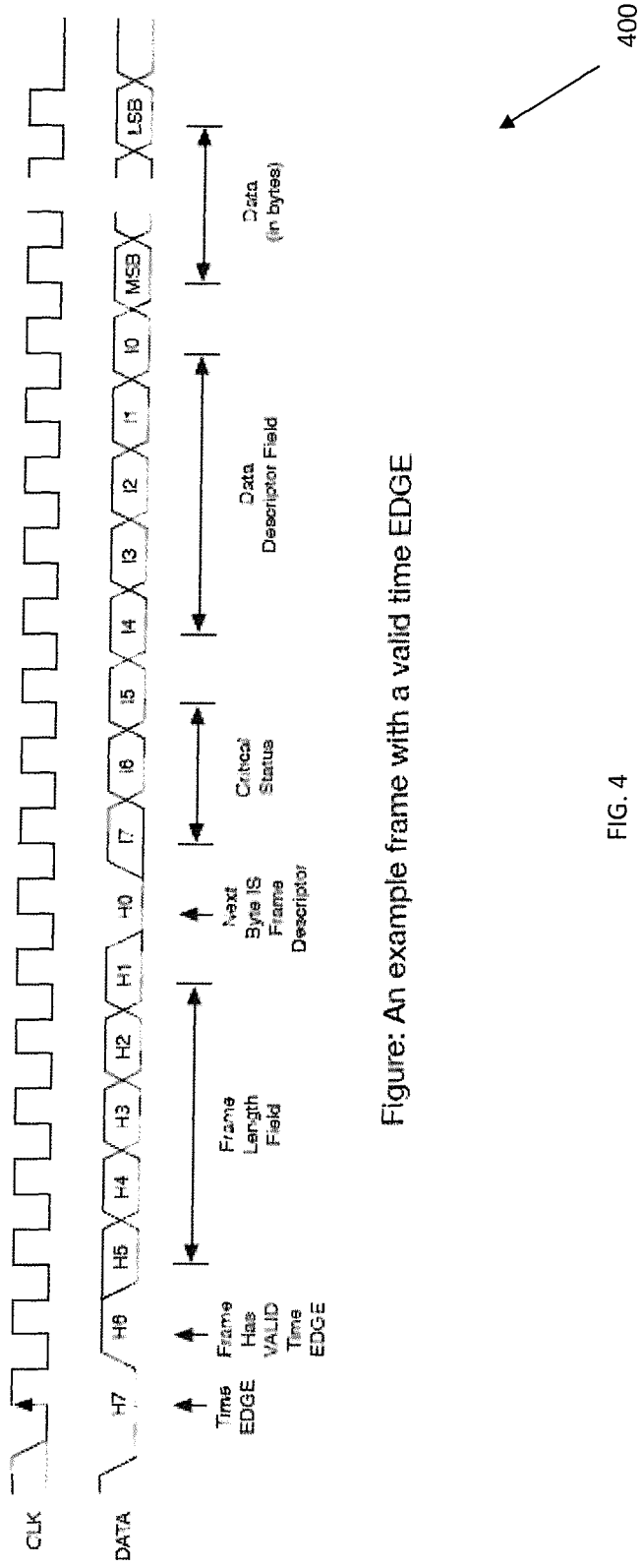
FIG. 4 is a graphical representation of one exemplary data transaction based on an exemplary serial time protocol (STP), having a valid edge transition.
Figure 5:
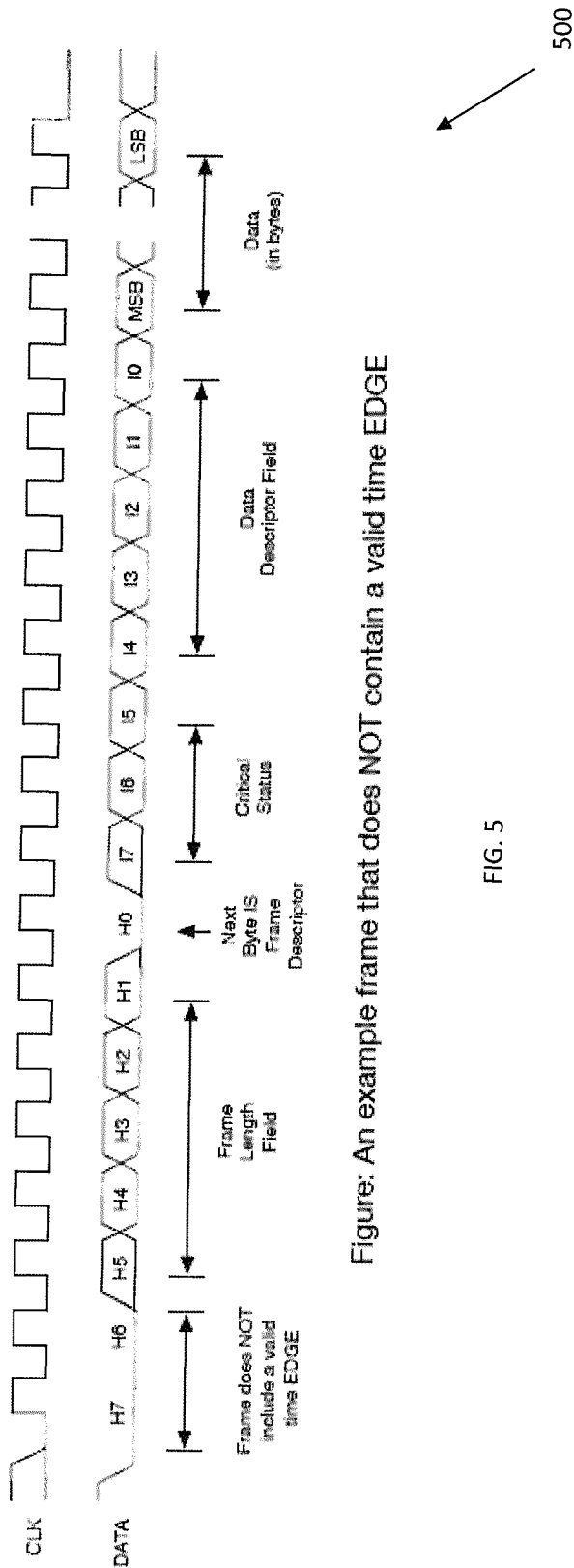
FIG. 5 is a graphical representation of one exemplary data transaction based on an exemplary serial time protocol (STP), without a valid edge transition.

Referring now to FIGS. 4 and 5, two exemplary data transactions based on the exemplary serial time protocol (STP) are illustrated. Each frame has a length which is a multiple of eight (8) bits. As shown, the multi-byte data words are Big-Endian (the most significant bit (MSB) for both bits and bytes are transmitted first). A frame includes a frame header (one (1) byte denoted [H7:H0]). It is further appreciated that while Big-Endian nomenclature is used throughout, Little-Endian nomenclature (the least significant bit (LSB) for both bits and bytes are transmitted first) may be used in alternative implementations with equal success.

The format of the exemplary implementation of the frame may be either: (i) an absolute timestamp, or (ii) a frame status descriptor (one (1) byte denoted bits [17:I0]) and associated data (up to thirty one (31) bytes). The exemplary frame header is further formatted according to specific rules: (i) the first bit of every frame is a logic low (i.e., H7=0); (ii) the length of the frame is specified by the frame length field included in the frame header (i.e., [H5:H0]); and (iii) each frame can have a valid edge (as shown in FIG. 4) or no valid edge (as shown in FIG. 5), where the edge may only occur at the transition of H7. By inference, any sequence of logic highs ("1") clocked in on DATA beyond the length of the frame should be ignored, as the next logic low ("0") indicates the start of the next frame. Additionally, the last bit of the frame header (H0) indicates if the frame is an absolute timestamp or a frame status descriptor and associated data. A complete description of the frame header is provided in APPENDIX A hereto.

Where the frame provides an absolute timestamp, the timestamp is provided immediately after the frame header. The format of the absolute timestamp can be selected to suit the components. Common examples include, without limitation: an incrementing or decrementing count, a running time with reference to an external clock (e.g., HH:MM:SS, etc.), a total running time, etc.

One exemplary frame status descriptor is provided in APPENDIX B hereto. The frame status descriptor is provided to enable flexibility for various timing synchronization architectures. Generally, the frame status descriptor will include: (i) an indication if the time-transmitter is the system master, (ii) if the system time synchronization has been established, (iii) if the system time has been disrupted, and (iv) a descriptor of the encapsulated data.

In one salient example, the exemplary serial time protocol (STP) described herein enables the firmware of the time-transmitter to transmit a standalone edge transition with a single atomic operation, and then transmit the data associated with the standalone edge at a later (non-critical) time.

A standalone edge (i.e., an edge transition which is followed by data at a later non-critical time) can be provided according to any number of different approaches, including at least one of the following three (3) schemes: (i) a standalone edge frame header, (ii) extending an H6 CLK edge, and (iii) using a frame timeout timer. As a brief aside, a time-receiver may implement a frame timeout timer that will automatically reset the bus state when the time between the rising edges of a CLK exceed a maximum value. In some instances, the frame timeout timer may have a default value (e.g., 1000 microseconds (us)) that can be adjusted (see APPENDIX B, data descriptor [0x28]). In the event of a frame timeout, the time-receiver will ignore any received DATA. In some cases, if the clock pulse H6 has not occurred before the frame timeout, then the time-receiver will treat the edge transition as a valid edge signal; if a frame timeout occurs later in the frame then the clock edge validity is determined by the H6 bit. However, if a clock edge has occurred, the edge validity is determined according to the frame header bit (i.e., valid if H6 is logic high ("1"), ignored if H6 is logic low "0")).

Figure 6:
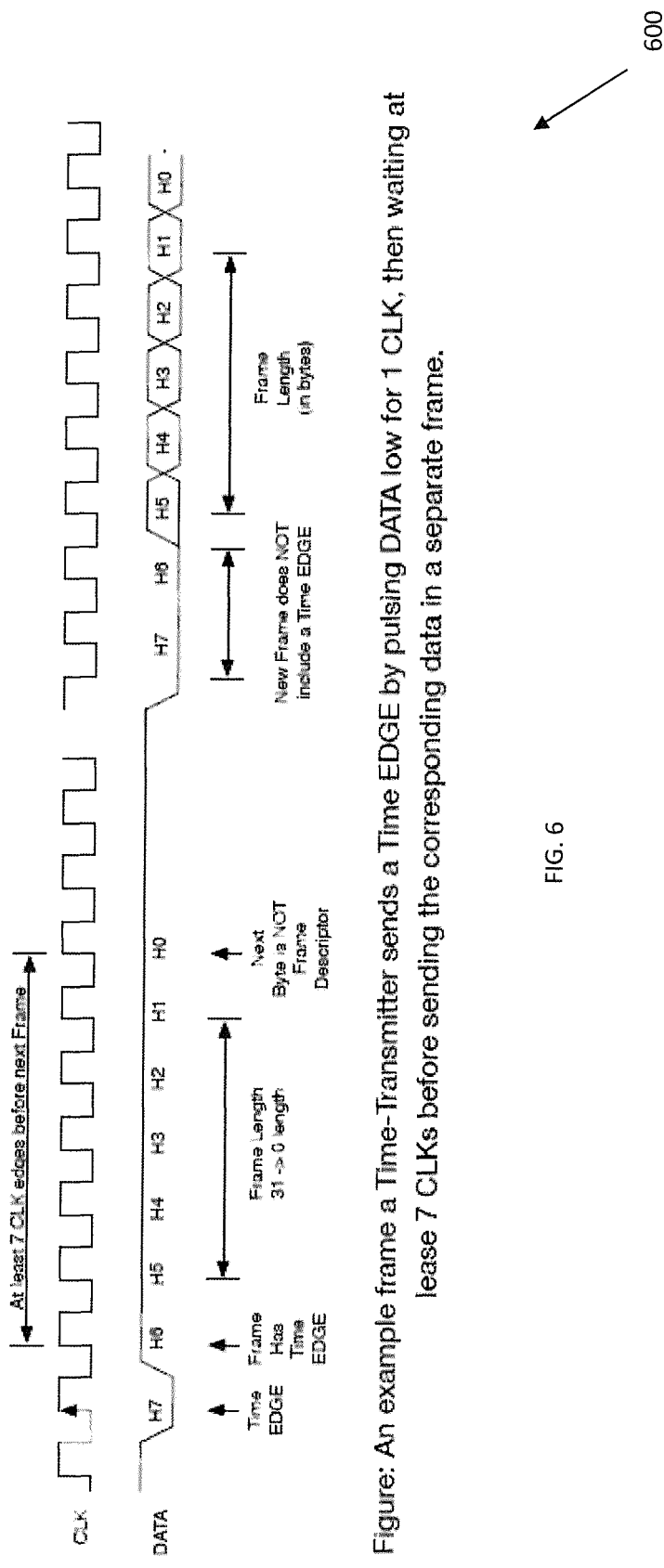
FIG. 6 is a graphical representation of a first exemplary scheme for generating an edge with a standalone edge header, in accordance with the present disclosure.

Referring now to FIG. 6, a first exemplary scheme for generating an edge with a standalone edge header is illustrated. As shown, for a free-running CLK, a single clocked in data bit (logic low "0") should be interpreted as a single edge (H7=0) as long as there are at least seven (7) subsequent clock edges to finish the header byte. At a later point, the time-transmitter should provide the information relevant to the standalone edge (e.g., an associated timestamp, etc.).

Figure 7:
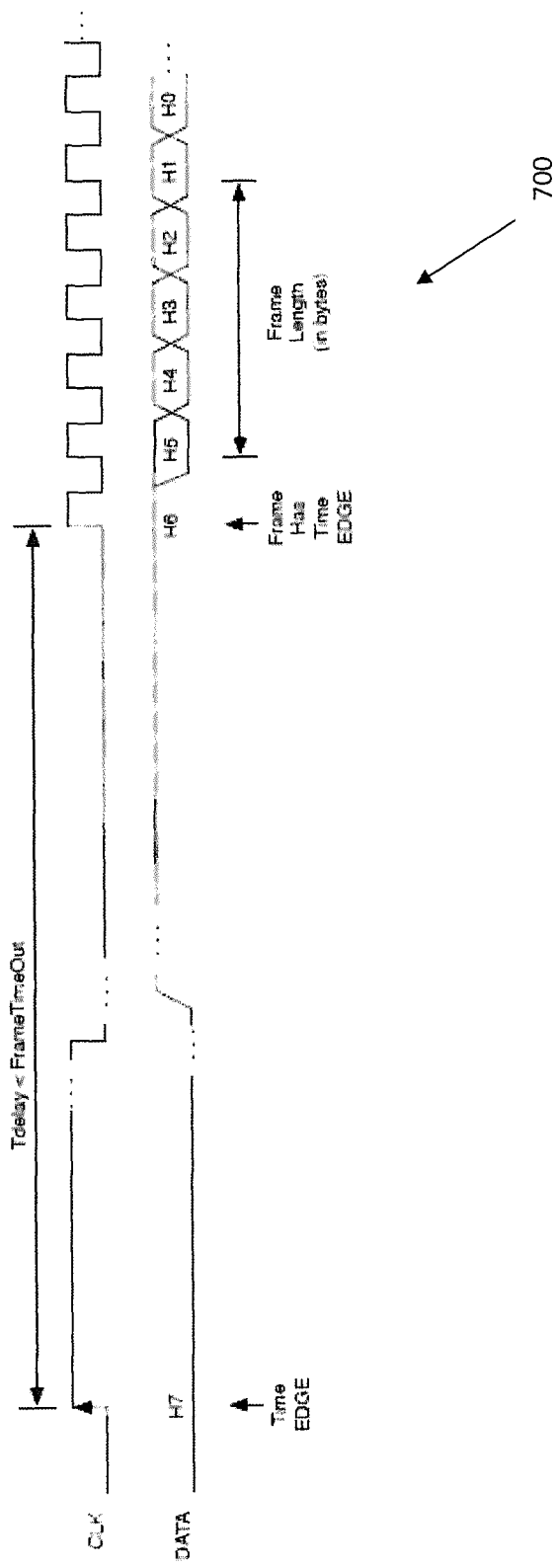
FIG. 7 is a graphical representation of a second exemplary scheme for generating an edge with an extended clock edge, in accordance with the present disclosure.

Referring now to FIG. 7, a second exemplary scheme for generating an edge with an extended H6 CLK edge is illustrated. As shown, the H6 CLK edge is extended until the time-transmitter firmware can provide the data necessary associated with the edge. Unlike FIG. 6, the CLK for FIG. 7 is a burst clock (i.e., CLK is not a free-running clock).

Figure 8:
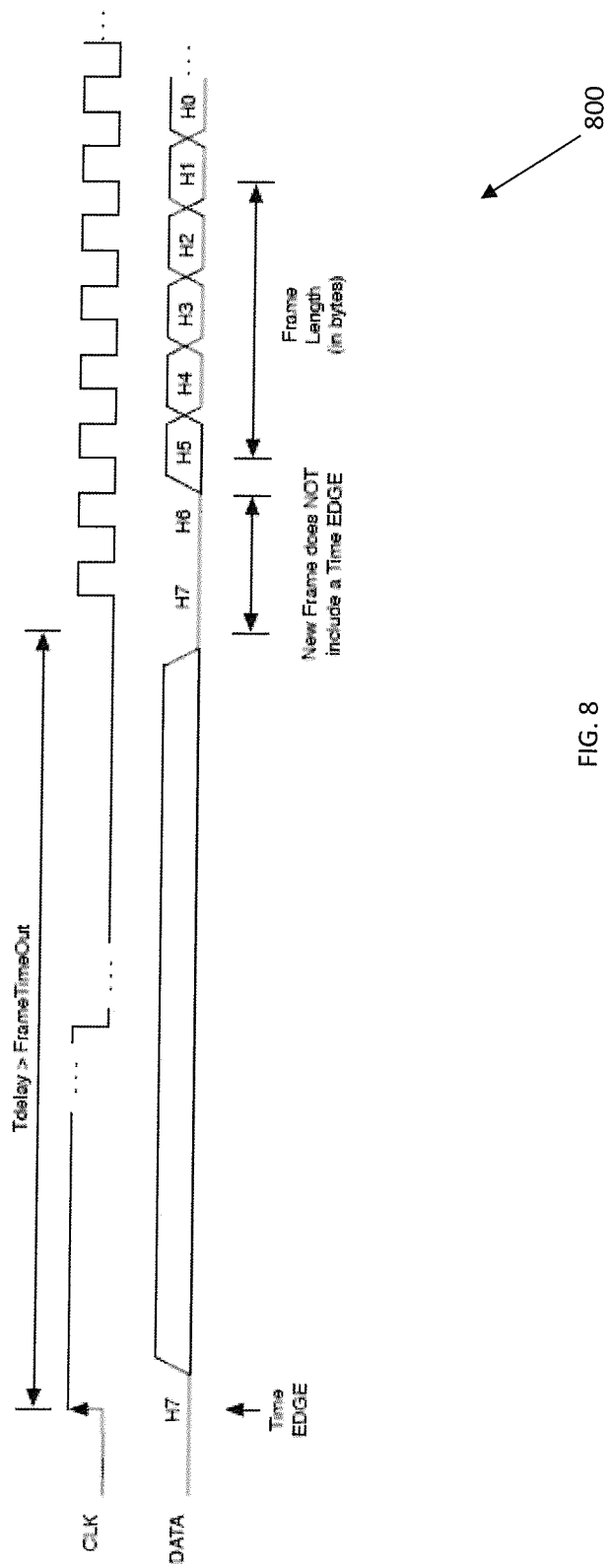
FIG. 8 is a graphical representation of a third exemplary scheme for generating an edge with a frame timeout timer, in accordance with the present disclosure.

Referring now to FIG. 8, a third exemplary scheme for generating an edge with a frame timeout timer is illustrated. As shown, the delay time between CLK edges must exceed the frame timeout timer value; this can be adjusted a priori. Unlike the scheme of FIG. 7, the time-transmitter can send a distinct frame rather than continuing the same frame.

IEEE 802.11v+IEEE 802.1as—

Figure 9:
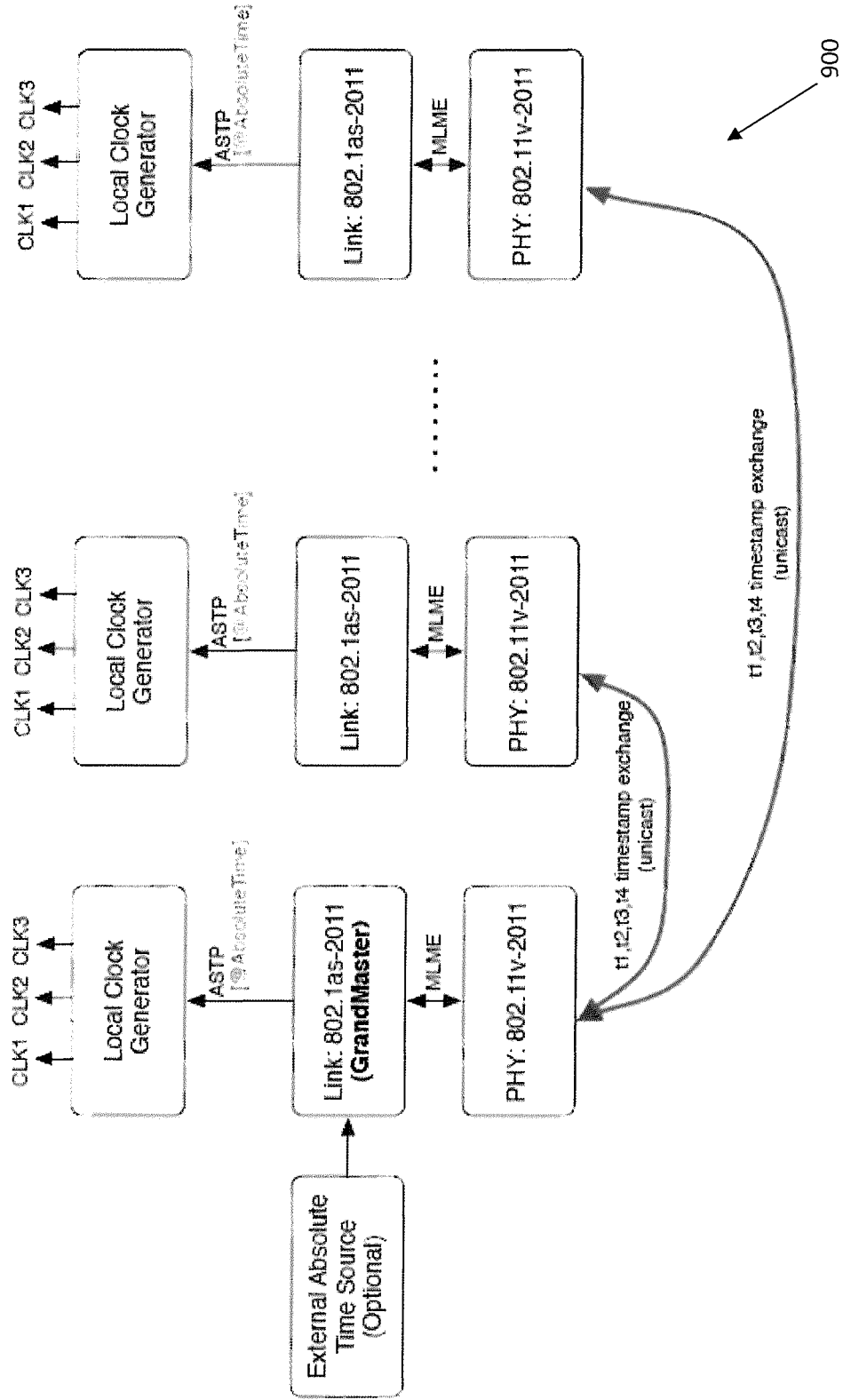
FIG. 9 is a graphical representation of a first exemplary time synchronization method according to one exemplary serial time protocol, and useful in a wireless network compliant with IEEE 802.11v and IEEE 802.1 as standards.

FIG. 9 provides a graphical representation of a first exemplary time synchronization method according to the exemplary serial time protocol (STP). As shown, each wireless device includes a local clock generator, a link layer compliant with IEEE 802.1as-2011 (see e.g., "*IEEE Standard for Local and Metropolitan Area Networks—Timing and Synchronization for Time-Sensitive Applications in Bridged Local Area Networks*" incorporated herein by reference in its entirety) and a physical layer compliant with IEEE 802.11v-2011 (see e.g., "*IEEE Standard for Information technology—Local and metropolitan area networks—Specific requirements—Part 11: Wireless LAN Medium Access Control (MAC) and Physical Layer (PHY) specifications Amendment 8: IEEE 802.11 Wireless Network Management*" incorporated herein by reference in its entirety). In one exemplary embodiment, the local clock generator of each device is a time-receiver that receives time information from the link layer time-transmitter. Additionally, the first wireless device is configured to master the time of the other wireless devices; in some variants, the master wireless device is provided with an external absolute time source.

As shown in this example, each wireless device is configured to issue an edge and transmit an absolute time value corresponding to the issued edge. The time-transmitters of each wireless device synchronize to one another according to timestamp exchanges. APPENDIX C provides an example of so-called "pseudo-code", configured to send a "time sync not established" status message until synchronization has been established, and then transmit an absolute timestamp every ten (10) milliseconds (ms) thereafter.

IEEE 802.11v Only—

Figure 10:
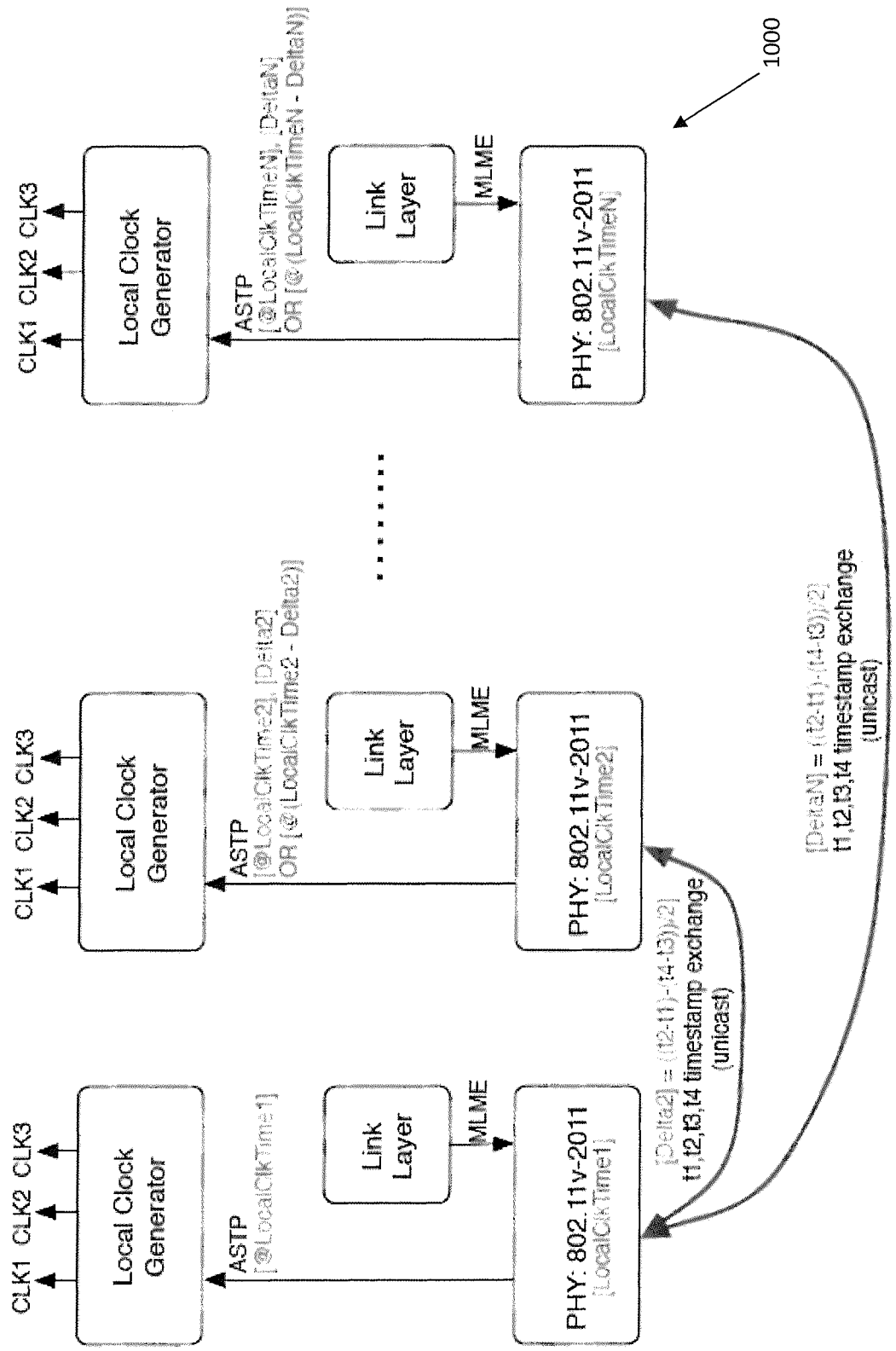
FIG. 10 is a graphical representation of a second exemplary time synchronization method according to one exemplary serial time protocol, and useful in a wireless network compliant with IEEE 802.11v standards.

FIG. 10 provides a graphical representation of a second exemplary time synchronization method according to the exemplary serial time protocol (STP). As shown, each wireless device includes a local clock generator, a physical layer compliant with IEEE 802.11v-2011, and a distinct link layer. Similar to the example of FIG. 9, the first wireless device of FIG. 10 is configured to master the time of the other wireless devices. Unlike the system of FIG. 9, each wireless device contains a distinct internal free-running clock which is implemented as a thirty two (32) bit counter with ten (10) nanosecond (ns) resolution.

As shown in this example, each wireless device is configured to issue an edge and transmit either: (i) a local clock value at the issued edge and a delta value, or (ii) a local clock value adjusted by a delta value at the issued edge, where the transmitted value(s) correspond to the issued edge. The delta values are determined according to for instance FIG. 11. In one exemplary embodiment, the delta value can be determined based on timestamps that are recorded in an atomic operation at known transaction intervals.

Figure 11:
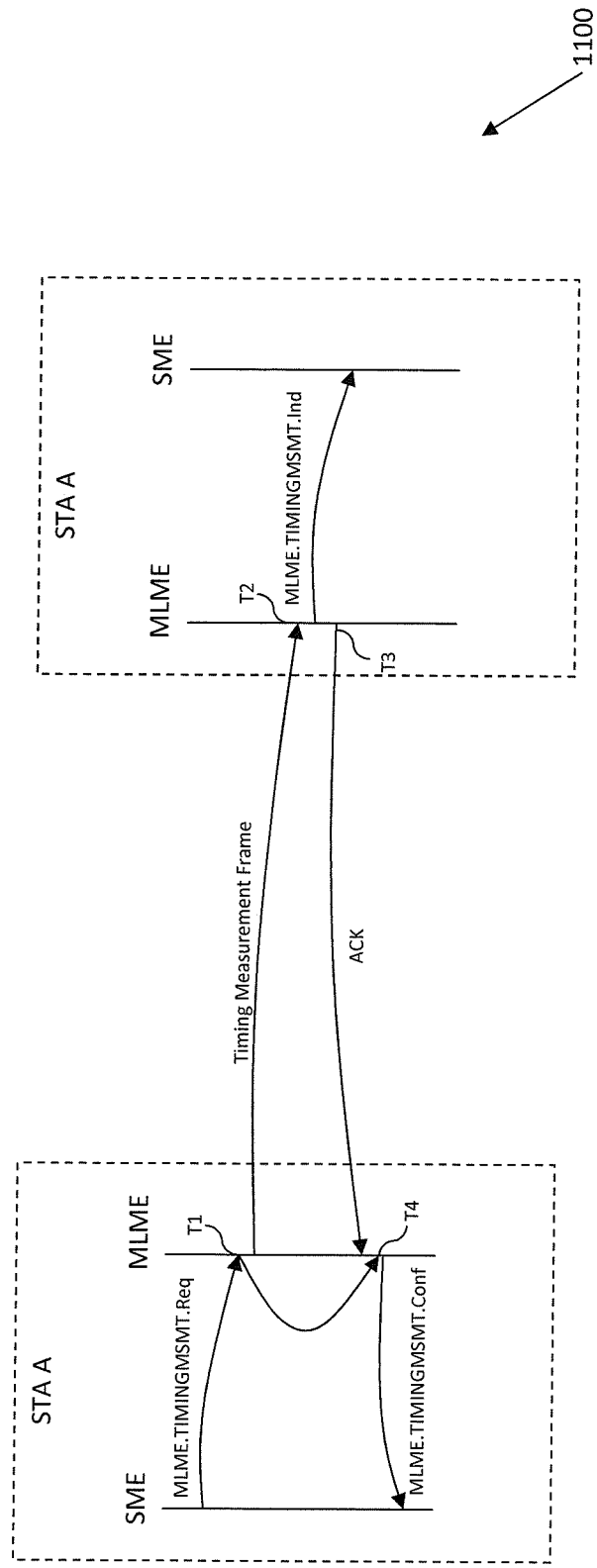
FIG. 11 is a logical ladder diagram representing a series of signaling transactions useful for illustrating the second exemplary time synchronization method of FIG. 10.

For example, as shown in FIG. 11, a first timestamp (U) is recorded when a first medium access control (MAC) sub-layer management entity (MLME) of a first wireless device transmits a timing measurement request (MLME.TIMINGMSMT.REQ). A second timestamp (t2) is recorded when a second MLME of a second wireless device receives the timing measurement request (MLME.TIMINGMSMT.REQ). A third timestamp (t3) is recorded when the second MLME of a second wireless device acknowledges the request (ACK). A fourth timestamp (t4) is recorded when the first MLME receives the acknowledgment.

APPENDIX D is a "pseudo-code" example for FIG. 10 and FIG. 11. Specifically, the time-transmitter of the master wireless device periodically sends a time measurement frame every one hundred and twenty five (125) milliseconds (ms) and sends a capture of its own local clock value. Each time-transmitter of the slave also provides a local capture of its local clock value each time it receives a time measurement frame, and a calculated delta as a separate frame. In one exemplary embodiment, the edge values received at the time-receivers do not correspond with the transmission or receipt of the time measurement frames, but are instead a separate capture of the corresponding time-transmitter's local clock (the local clock is also used to determine the t1, t2, t3, and t4 timestamps).

In Packet Timestamp Signaling—

Figure 12:
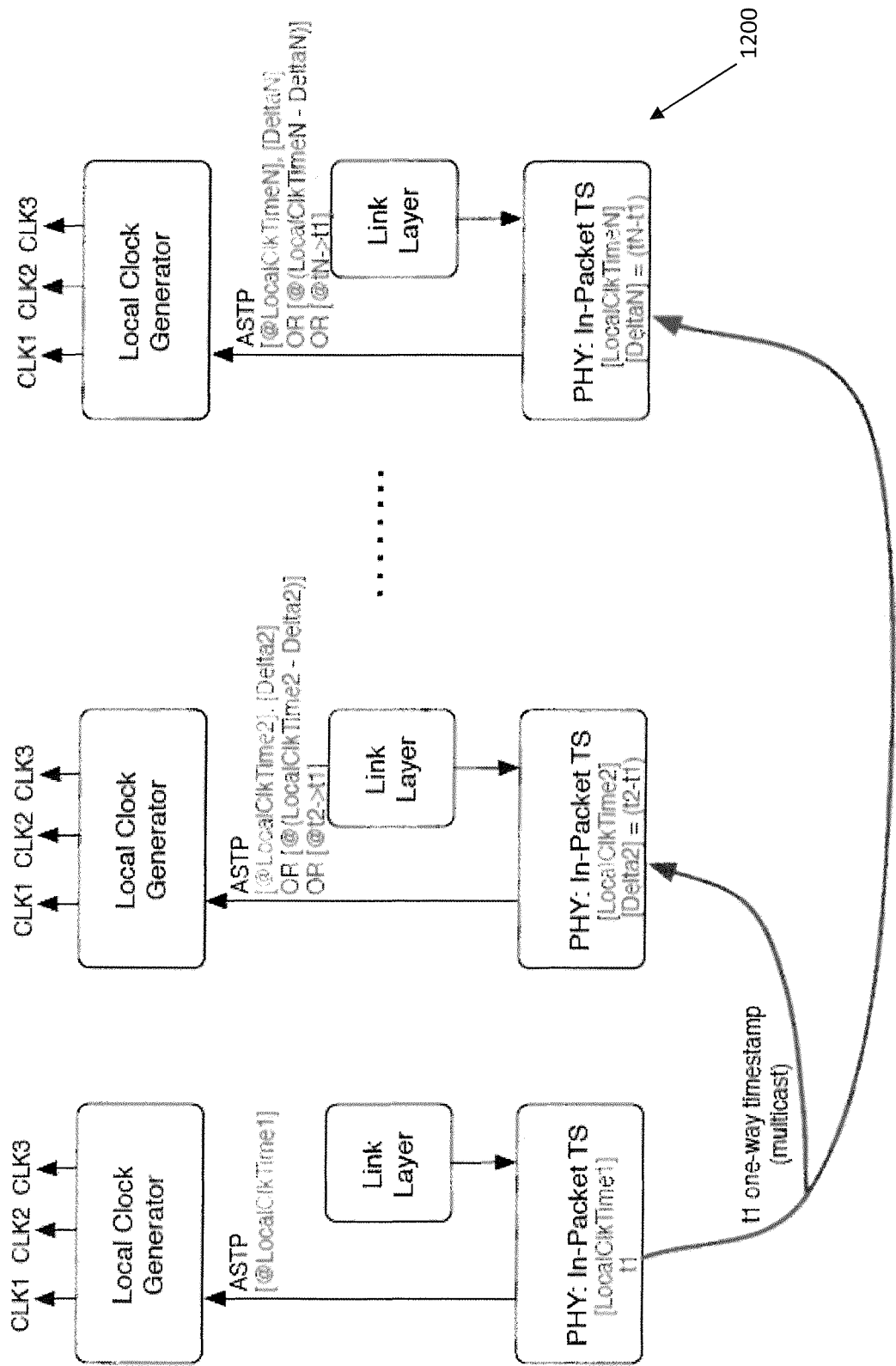
FIG. 12 is a graphical representation of a third exemplary time synchronization method according to one exemplary serial time protocol, and useful in a custom or proprietary time synchronization scheme based on multi-casted in-packet timestamps.

FIG. 12 provides a graphical representation of a third exemplary time synchronization method according to the exemplary serial time protocol (STP). As shown, each wireless device includes a local clock generator, a physical layer, and a distinct link layer. The example of FIG. 12 is suitable for use with a custom or proprietary time synchronization scheme based on multi-casted in-packet timestamps. Each wireless device contains a distinct internal free-running clock.

In this example, each time-transmitter is configured to perform one of: (i) issue an edge and the local clock counter value at the issued edge, and a delta value based on timestamps received from the master station, (ii) issue an edge at the local clock adjusted by the delta value, or (iii) issue an edge at the local value, but communicate the timestamp of when the master device had issued the timing measurement request.

SYNC and INDEX Signaling—

Figure 13:
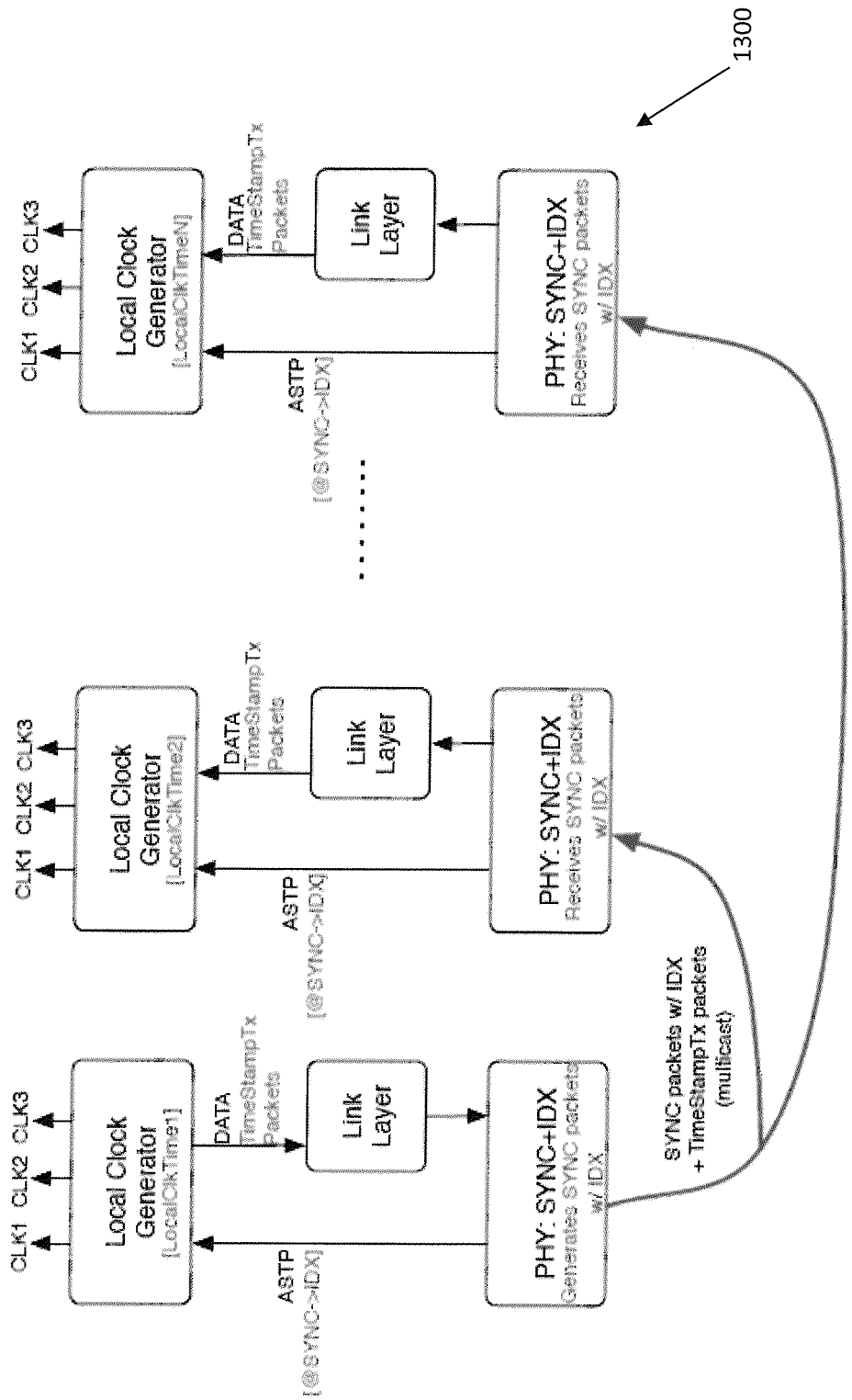
FIG. 13 is a graphical representation of a fourth exemplary time synchronization method according to one exemplary serial time protocol, and useful for use with integrated circuits which maintain a local clock.

FIG. 13 provides a graphical representation of a fourth exemplary time synchronization method according to the exemplary serial time protocol (STP). As shown, each wireless device includes a local clock generator, a physical layer, and a distinct link layer. One exemplary implementation of the exemplary time synchronization method of FIG. 13 is described in related co-owned, U.S. Provisional Patent Application No. 61/646,207 filed May 11, 2012 and entitled "METHODS AND APPARATUS FOR SYNCHRONIZING CLOCK SIGNALS IN A WIRELESS TEST SYSTEM" (now. U.S. patent application Ser. No. 13/604,275), incorporated by reference in its entirety. As shown, the master device generates the reference clock within its local clock generator. The physical layer of each device does not timestamp the packets, rather the physical layer transmits SYNC packets and timestamps each SYNC packet with its own reference clock (or INDEX value). The master clock generator can group several timestamps together to form a secondary timestamp packet (TimeStampTx) which is sent to each remote station and forwarded via the link layer to the local clock generator.

APPENDIX E is a "pseudo-code" example for FIG. 13. In this example, each time-transmitter is configured to issue an edge when SYNC packets are transmitted or received, and communicate the INDEX value corresponding to a SYNC packet transmission.

Time Sync Function (TSF) Signaling—

Figure 14:
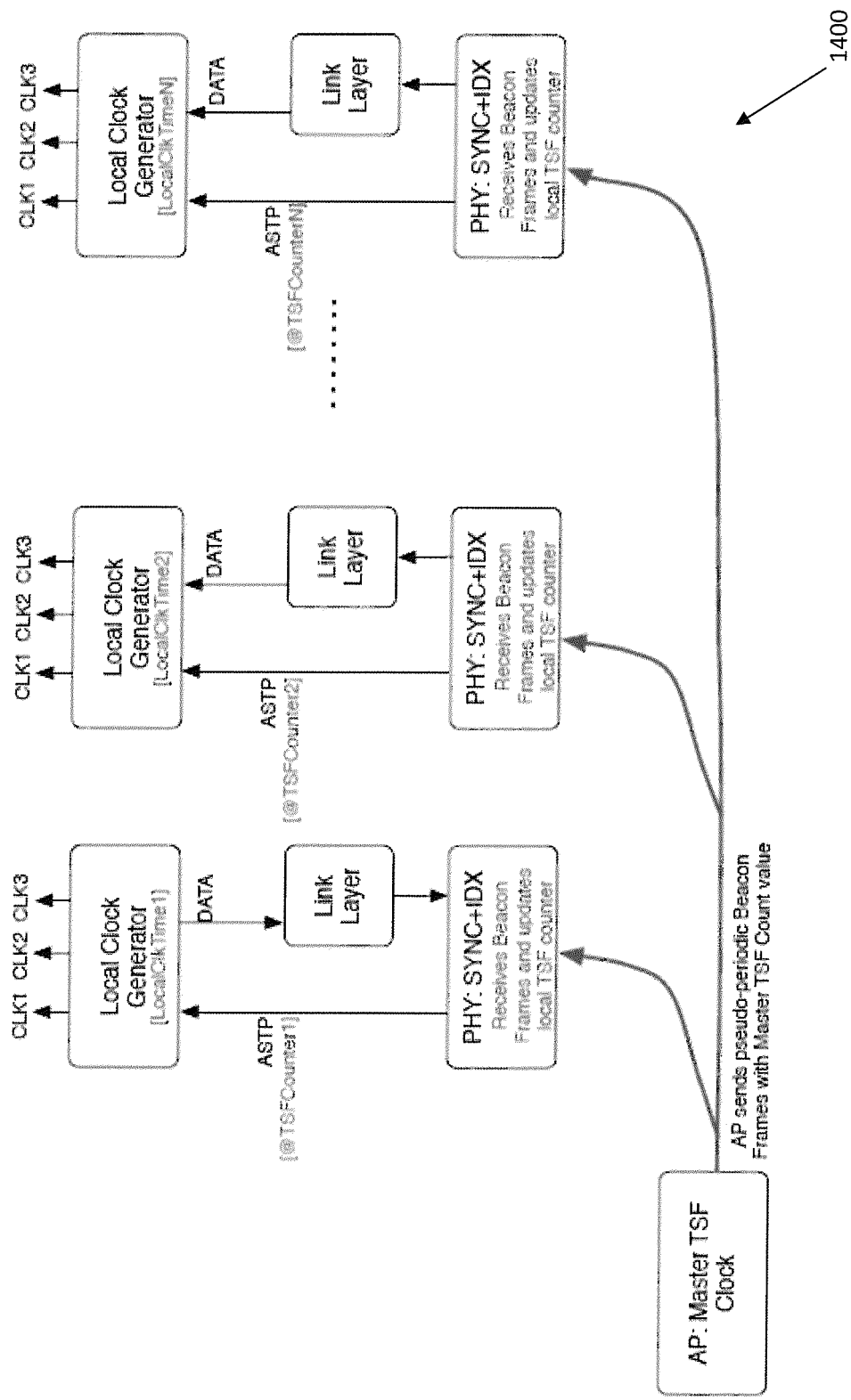
FIG. 14 is a graphical representation of a fifth exemplary time synchronization method according to one exemplary serial time protocol, and useful for use with Time Sync Function (TSF) signaling.

FIG. 14 provides a graphical representation of a fifth exemplary time synchronization method according to the exemplary serial time protocol (STP) which incorporates a system TSF (Time Sync Function) clock. As shown, each wireless device includes a local clock generator, a physical layer, and a distinct link layer. Additionally, an Access Point (AP) has a master TSF clock which is used to provide pseudo-periodic Beacon Frames, with Master TSF count values.

As a brief aside, many existing Wi-Fi systems provide a system TSF clock. The TSF counter is a 64-bit value that indicates a running time in microseconds (mS). In existing infrastructure systems, the AP contains the master TSF clock, and periodically sends the TSF counter in "Beacon Frames" (approximately 10 Beacon Frames are transmitted per second). Each associated wireless device updates its local TSF counter whenever a new Beacon Frame is received.

Accordingly, in one exemplary embodiment, the AP transmits an edge signal, and then transmits the TSF counter value that directly corresponds to that edge. In one variant, the TSF counter value is a "raw" value. A raw TSF counter value can be used if the receiver does not perform TSF filtering when Beacon Frames are received. In these scenarios, the receiver can expect the TSF counter value to significantly "jump" or "skip" whenever a new Beacon Frame is received. In some cases, where a Beacon Frame has been received and the TSF was properly updated, the receiver may additionally notify other software (e.g., via a register, etc.) that a jump in TSF is likely to, or has, occurred.

In another variant, the TSF counter value may be an "estimated" value. Estimated TSF values may be useful where the receiver performs TSF filtering on the local TSF clock to e.g., predict the master TSF clock. In some implementations, the receiver may notify other software that a Beacon Frame has been received. APPENDIX F is a "pseudo-code" example corresponding to FIG. 14.

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features applicable to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the disclosure should be determined with reference to the claims.

APPENDIX A

© Copyright 2012-2013 Apple Inc. All

| Bit | Description |
| --- | --- |
| <H7> | Always 0 to indicate start of frame and represents time EDGE |
| <H6> | Time EDGE Validity:<br>1: Time EDGE VALID<br>0: Time EDGE NOT VALID (Any data contained in the frame shall be considered relevant ONLY for the previous VALID time edge). |
| <H5:H1> | Total length of frame in bytes - 2:<br>11111 -> 0 additional bytes (Total frame length including header = 1 byte)<br>00000 -> 1 additional bytes (Total frame length including header = 2 bytes)<br>00001 -> 2 additional bytes (Total frame length including header = 3 bytes)<br>...<br>00100 -> 5 additional bytes (Total frame length including header = 6 bytes -> 32 bit data)<br>...<br>01010 -> 11 additional bytes (Total frame length including header = 12 bytes -> 80 bit data)<br>...<br>11110 -> 31 additional bytes (Total frame length including header = 32 bytes) |
| <H0> | Is next byte a Frame Status Descriptor?<br>1: Next byte is NOT a Frame Status Descriptor. The data following is always: [AbsoluteTime]<br>0: Next byte is a Frame Status Descriptor |

APPENDIX B

© Copyright 2012-2013 Apple Inc. All

| Bit | Name | Description |
| --- | --- | --- |
| <I7> | StatMaster | Is Time-Transmitter the System Master?<br>1: Time-Transmitter is also the overall time sync master station<br>0: Time-Transmitter is NOT the overall time sync master station<br>(i.e. another station's Time-Transmitter is the overall time sync master) |
| <I6> | StatTimeSync | System Clock Sync Status:<br>1: System Time Sync has been established<br>0: System Time Sync has NOT been established |
| <I5> | StatDisturb | System Clock Sync Disruption (all except TSF Descriptors):<br>1: Recent Clock Sync Disruption has occurred<br>(i.e time sync packets over wifi haven't been received in a while) |

-continued

| Bit | Name | Description | | |
|---|---|---|---|---|
| | | 0: No Recent Clock Sync Disruptions have occurred For TSF Descriptors, see the frame description below for the StatDisturb definition. | | |
| <I4:I0> | DataDescriptor | Bit | Data Name | Description* |
| | | 00000 (0) | [AbsoluteTime] | System 802.1AS "Absolute Time" (if available) 80-bit value defined as: UInteger48 seconds; UInteger32 nanoseconds; Value after Rx Reset = 0 (0x00 0000 0000) |
| | | 00001 (1) | [LocalTime] | Local time of a free-running clock within the Time-Transmitter (if available) Words up to 128-bits supported Value after Rx Reset = 0 (0x0000 0000 0000 0000) |
| | | 00010 (2) | [RemoteTime] | Remote time on remote system free-running clock (if available) [RemoteTime] = [LocalTime] − [LocalDelta] Words up to 128-bits supported Value after Rx Reset = 0 (0x0000 0000 0000 0000) |
| | | 00011 (3) | [Index] | EDGE packet index value. (if available) Words up to 32-bit supported: Value after Rx Reset = 0 (0x0000) |
| | | 00100 (4) | [T1] | t1 value (see 802.11v-2011 spec) if available 32-bit value: Value after Rx Reset = 0 (0x0000) |
| | | 00101 (5) | [T2] | t2 value (see 802.11v-2011 spec) if available 32-bit value: Value after Rx Reset = 0 (0x0000) |
| | | 00110 (6) | [T3] | t3 value (see 802.11v-2011 spec) if available 32-bit value: Value after Rx: Reset = 0 (0x0000) |
| | | 00111 (7) | [T4] | t4 value (see 802.11v-2011 spec) if available 32-bit value: Value after Rx Reset = 0 (0x0000) |
| | | 01000 (8) | [LocalDelta] | Difference in time between free-running clock on Time-Transmitter vs overall system master (if available) 802.11v method: ((t2 − t1) − (t4 − t3)]/2 In-Packet-Sync method: (t2 − t1) Words up to 32-bit supported: Value after Rx Reset = 0 (0x0000) |
| | | 01001 (9) | [JitterEstimate] | Estimated amount of EDGE to EDGE jitter (if available) This could be either a fixed system value, or could be used if the jitter is expected to vary based on network conditions. Words up to 32-bit supported: Value after Rx Reset = 0 (0x0000) |
| | | 01010 (10) | [AdditionalStat] | Additional system status bits (user defined) |
| | | 01011 (11) | [TSFCountRaw] | Raw TSF counter value in the WiFi PHY. It is expected that there is no software filter or algorithms, and that this value may jump if a Beacon Frame is received. StatDisturb helps |

-continued

| Bit | Name | Description |
|---|---|---|
| | | the Time-Receiver differentiate between drifts in the local TSF clock, and the master TSF clock. Therefore, StatDisturb is defined as:<br>1 - Beacon Frame has been received since the last ASTP frame, and the local TSF counter has been updated. (This bit is used to tell the Time-Receiver to expect a discontinuity in the TSF count.)<br>0 - Beacon Frame has NOT been received since the last ASTP frame.<br>TSF Counts are always 64-bit words counting in increments of 1us. |
| 01100 (12) | [TSFCountEst] | Estimated TSF counter value of the TSF Master. It is presumed that some type of software algorithm is used in the WiFi chip to filter the TSF, and attempts to always present an estimation of the TSF clock counter of the Master. StatDisturb helps the Time-Receiver determine how often Beacon packets are being received or dropped. Therefore,<br>StatDisturb is defined as:<br>1 - Beacon Frame has been received since the last ASTP frame<br>0 - Beacon Frame has NOT been received since the last ASTP frame.<br>TSF Counts are always 64-bit words counting in increments of 1us. |
| 01101 (13) . . . 11011 (27) | RESERVED | RESERVED |
| 11100 (28) | [FrameTimeOut] | FrameTimeOut in microseconds, 32-bit value<br>Value after Rx Reset = 1000uSec. (0x000003E8)<br>Valid range: 1usec to 4295 sec<br>0 -> Disable FrameTimeOut |
| 11101 (29) | [DescriptExt] | Frame Descriptor Extension<br>Next byte is an additional user defined frame descriptor |
| 11110 (30) | [Interrupt] | General Purpose Interrupt over ASTP (if available)<br>Data field is the interrupt value (user defined)<br>Can be used to send a synchronized interrupt across the system |
| 11111 (31) | [Reset] | Time-Receiver Reset<br>Upon receipt of [Reset], a Time-Receiver should clear all past time information, reset all internal counters, and return to the default power-on-reset state.<br>It is recommended that the Time-Transmitter always issue [Reset] once after the underlying time synchronization protocol has been established |

*Not all Time-Transmitters or Time-Receivers are expected to implement every DataDescriptor described here, since the available time sync information varies depending on the underlying time sync architecture.

APPENDIX C

© Copyright 2012-2013 Apple Inc. All

```
struct Timestamp {
    UInteger48 seconds;
    UInteger32 nanoseconds;
}; //80-bit 802.1AS TimeStamp example
//Function pseudo prototypes
int SendASTPEdgeData(FrameHeader,FrameDescriptor,
TimeCaptureFunction)
int SendASTPDataOnly(FrameHeader,FrameDescriptor,Data);
Timestamp CaptureTime(ClockSource);
int LoopOnAnyTimeTransmitter ( ) {
    SendASTPDataOnly(0x00,0x1F); //Send Reset to Time-Receiver
    while(TimeSyncNotEstablished) {
        SendASTPDataOnly(0x3E,0x00, null); //Continuously send
        StatTimeSync=0, no data
        wait(100ms);
    }
    while(TimeSyncEstablished) {
        SendASTPEdgeData(0x54,0x40,
        CaptureTime(AbsoluteLocalClock));
//(Sends 12-bytes with EDGE: 1 byte Frame Header, 1 byte Frame
Descriptor, 10 bytes 802.1AS TimeStamp captured at exact moment
EDGE was sent)
        wait(10ms)
    }
}
```

APPENDIX D

© Copyright 2012-2013 Apple Inc. All

```
Both Stations:
struct 802-11-V-Timestamp {
    UInteger32 t1;
    UInteger32 t2;
    UInteger32 t3;
    UInteger32 t4;
}; //32-bit 802.11v TimeStamp example in units of 10ns
//Function pseudo prototypes
int SendASTPEdgeData(FrameHeader,FrameDescriptor,
TimeCaptureFunction)
int SendASTPDataOnly(FrameHeader,FrameDescriptor,Data);
UInteger32 CaptureTime(ClockSource);
Master Station:
int Master ( ) {
    802-11-V-Timestamp VTimeStamp;
    Integer32 FixedOffset = ???;
    SendASTPDataOnly(0x00,0x1F); //Send Reset to Time-Receiver
    while(1) {
// Request Timing Measurement Frame to be sent
        MLME-TIMINGMSMT.request(SlaveMACAddress);
// Wait for ACK with t1,t2,t3,t4 timestamps to return from Slave:
        VTimeStamp = MLME-TIMINGMSMT.confirm( );
//Capture instance of local clock and send out over ASTP as 32-bit value:
        SendASTPEdgeData(0x48,0xC1,CaptureTime(LocalClock));
//OPTIONAL: Since this is the master,we actually don't need to the
VTimeStamp, so we can just send clock delta = 0 (or any desired fixed
signed offset) over ASTP as normal data:
        SendASTPDataOnly(0x08,0xC8,FixedOffset);
        wait(125ms);
    }
}
Slave Station:
int Slave ( ) {
    802-11-V-Timestmp VTimeStamp;
    Integer32 TimeDelta; /// 32-bit signed integer
    SendASTPDataOnly(0x00,0x1F); //Send Reset to Time-Receiver
    while(1) {
// Wait for Time Measurement Frame from Master to determine t1,t2,t3,t4:
        VTimeStamp = MLME-TIMINGMSMT.indication( );
```

-continued

```
//Capture instance of local clock and send out over ASTP as 32-bit value:
        SendASTPEdgeData(0x48,0x41,CaptureTime(LocalClock));
//Send corresponding clock delta ((t2-t1)-(t4-t3))/2 over ASTP as
non edge critical data:
        TimeDelta = ((VTimeStamp.t2-VTimeStamp.t1)-
        (VTimeStamp.t4-VTimeStamp.t3) >> 1);
        SendASTPDataOnly(0x08,0x48,TimeDelta);
    }
}
```

APPENDIX E

© Copyright 2012-2013 Apple Inc. All

```
Both Stations:
//Function pseudo prototypes
int SendASTPEdgeData(FrameHeader,FrameDescriptor,
TimeCaptureFunction)
int SendASTPDataOnly(FrameHeader,FrameDescriptor,Data);
Master Station:
UInteger32 SendSYNCPacket(INDEX);
int Master ( ) {
    UInteger32 CurrentINDEX;
    CurrentINDEX = 0;
    SendASTPDataOnly(0x00,0x1F); //Send Reset to Time-Receiver
    while(1) {
//Sends EDGE over ASTP at exact instant SYNC packet is sent out,
and follows up with 32-bit INDEX value corresponding to SYNC
packet transmitted
        SendASTPEdgeData(0x48,0xC3,
        SendSYNCPacket(CurrentINDEX++));
        wait(125ms);
    }
}
Slave Station:
UInteger32 ReceiveSYNCPacket( ); //Blocks while waiting for SYNC
packet
int Slave ( ) {
    UInteger32 ReceivedINDEX;
    SendASTPDataOnly(0x00,0x1F); //Send Reset to Time-Receiver
    while(1) {
//Sends EDGE over ASTP at exact instant SYNC packet is received,
and follows up with 32-bit INDEX value corresponding to SYNC
packet received
        SendASTPEdgeData(0x48,0x43,ReceiveSYNCPacket( ));
    }
}
```

APPENDIX F

© Copyright 2012-2013 Apple Inc. All

```
//Function pseudo prototypes
int SendASTPEdgeData(FrameHeader,FrameDescrptor,
TSFTTimeCaptureFunction);
UInteger64 TSFTimeCaptureFunction( );
char BeaconFrameRecentlyReceived; // Beacon Frame Recently
Received? 0x20 -> Yes, 0x00 -> No
char WiFiAssociated; // Is the station associated? 0x40 -> Yes,
0x00 -> No
char IsTSFMaster; // Is this station the TSP Master? 0x80 -> Yes,
0x00 -> No
Using [TSFCountRaw]:
int beaconframe_received = 0;
while(1) {
    if(BeaconFrameRecentlyReceived && ~beaconframe_received) {
        beaconframe_received = 1;
        SendASTPEdgeData(0x50,0x2B | WiFiAssociated |
        IsTSFMaster,TSFTimeCaptureFunction( ));
    else {
```

-continued

```
        if(~BeaconFrameRecentlyReceived( )) {
            beaconframe_received = 0;
        }
        SendASTPEdgeData(0x50,0x0B | WiFiAssociated |
        IsTSFMaster,TSFTimeCaptureFunction( ));
    }
    wait(TBD us);
}
Using [TSFCountEst]:
int beaconframe_received = 0;
while(1) {
    if(BeaconFrameRecentlyReceived && ~beaconframe_received) {
        beaconframe_received = 1;
        SendASTPEdgeData(0x50,0x2C | WiFiAssociated |
        IsTSFMaster,TSFTimeCaptureFuntion( ));
    else {
        if(~BeaconFrameRecentlyReceived( )) {
            beaconframe_received = 0;
        }
        SendASTPEdgeData(0x50,0x0C | WiFiAssociated |
        IsTSFMaster,TSFTimeCaptureFuntion( ));
    }
    wait(TBD us);
}
```

What is claimed is:

1. A method for synchronization of integrated circuits (IC) within a wireless device, comprising:
generating an edge signal and transmitting the edge signal to a receiver, wherein the receiver is within the wireless device;
calculating a value associated with the edge signal; and
transmitting the value to the receiver, the value comprising a time reference instruction that is configured to modify calculation of a time reference with respect to the transmitted edge signal;
wherein the transmitting the value occurs before the generating the edge signal, and
wherein the edge signal is generated according to an atomic operation that is executed without compiler optimization.

2. The method of claim 1, wherein the value comprises a time value.

3. The method of claim 1, wherein the value comprises a data value.

4. The method of claim 1, further comprising:
calculating an absolute timestamp associated with the edge signal; and
providing the absolute timestamp.

5. The method of claim 1, wherein the value comprises a data frame, the data frame comprising a frame header formatted according to one or more rules.

6. The method of claim 5, wherein the frame header is configured to indicated whether the data frame comprises an absolute timestamp or a frame status descriptor and data associated thereto.

7. A method for precisely determining a time reference within a wireless device, comprising:
receiving an edge signal at a receiver, wherein the receiver is within the wireless device,
wherein the edge signal denotes a specific moment in time;
receiving a value, the value comprising a time reference instruction that is configured to modify calculation of a time reference with respect to the received edge signal; and
calculating the time reference based at least on the value and the edge signal;
wherein the receiving the edge signal occurs after the receiving the value, and
wherein the edge signal is generated according to an atomic operation that is executed without compiler optimization.

8. The method claim 7, wherein the time reference comprises an absolute time value associated with the edge signal.

9. The method of claim 7, wherein the time reference comprises a relative time value associated with the edge signal.

10. The method of claim 7, wherein the value comprises a data value.

11. A wireless device, comprising:
one or more wireless interfaces; and
logic in data communication with the one or more wireless interfaces, the logic configured to cause the wireless device to:
issue an edge signal to a receiver, wherein the receiver is in the wireless device;
determine a value associated with the edge signal, the value comprising a time reference instruction that is configured to modify calculation of a time reference with respect to the edge signal; and
transmit the value to the receiver;
wherein the issuance of the edge signal occurs after the transmission of the value, and
wherein the edge signal is generated according to an atomic operation that is executed without compiler optimization.

12. The wireless device of claim 11, further comprising a local time reference component;
wherein the value is based at least on a reference time provided by the local time reference component.

13. The wireless device of claim 12, wherein at least one of the one or more wireless interfaces comprises an Institute of Electrical and Electronics Engineers (IEEE) Std. 802.11 compliant interface.

14. The wireless device of claim 11, wherein the value is configured to allow one or more other wireless devices associated with the receiver to calculate the time reference.

15. The wireless device of claim 11, wherein a combination of the edge signal and the value is configured to allow one or more other wireless devices associated with the receiver to calculate the time reference.

16. The wireless device of claim 11, wherein the edge signal is issued using a frame timeout timer.

17. The wireless device of claim 11, wherein the time reference instruction is configured to reset the time reference at receipt of the edge signal or pre-set the time reference at receipt of the edge signal.

18. The wireless device of claim 11, wherein the time reference instruction is configured to advance the time reference at receipt of the edge signal or retard the time reference at receipt of the edge signal.

* * * * *